July 8, 1930. C. J. HANIMAN 1,769,949
METHOD OF AND APPARATUS FOR CONTROLLING THE TEMPERATURE OF HEATING SURFACES
Filed Aug. 6, 1920 7 Sheets-Sheet 2

Fig. 2.

INVENTOR.
Charles J. Haniman
BY
Gifford V Bull
his ATTORNEYS.

Patented July 8, 1930

1,769,949

UNITED STATES PATENT OFFICE

CHARLES J. HANIMAN, OF BAYONNE, NEW JERSEY, ASSIGNOR TO THE BABCOCK & WILCOX COMPANY, OF BAYONNE, NEW JERSEY, A CORPORATION OF NEW JERSEY

METHOD OF AND APPARATUS FOR CONTROLLING THE TEMPERATURE OF HEATING SURFACES

Application filed August 6, 1920. Serial No. 401,748.

My invention relates to a means of controlling or limiting the temperature of heating surfaces through which steam, gas or liquid may absorb heat from any given source. Although applicable to any kind of boiler, it is particularly adapted to control the temperature of heating surfaces by means of the temperature of the steam in steam generators of the type in which boiler tubes are connected end to end in series and which water is converted to steam at an unusually rapid rate.

To illustrate my device, which I will hereinafter term a temperature controller, I have shown it applied to a boiler of this type, wherein the water passes through a series of tubes and in which the feed water enters the tubes located in the coolest gases and is gradually heated and finally converted to steam in the tubes located in the hottest gases. Therefore when the water reaches the tubes which lie in the hottest gases it has been almost or entirely vaporized and may attain various degrees of superheat depending on furnace conditions, intensity of the fire and the like, and on the feed water supply. It will be understood that the feeding of water in a system of this character, is extremely rapid and must be continuous. If at any time the heating surfaces of the tubes located in the hottest gases reaches too high a temperature, the tubes will be burned, and their utility destroyed.

In the illustrative embodiment of my invention shown in the drawings, a temperature controller is provided which is designed to apply automatically, when necessary, a suitable cooling medium, such as water, to the tubes forming the heating surfaces, and more particularly to the tubes located in the hottest gases, to prevent the heating of such tubes to a degree that may be detrimental to their life.

In practicing my invention I preferably construct my controller to embody two closed vessels or chambers containing any volatile liquid such as water, alcohol or mercury to be subjected to relatively different degrees of temperature and thereby form pressure chambers under different pressures. The said chambers will hereinafter be termed pressure chambers or thermostats, although I do not wish to be understood as limiting my invention to any particular form of thermostat, since obviously many different forms may be used in carrying out my invention.

It is a well known physical fact that in evaporating a given volatile liquid in a closed vessel there is a certain definite pressure corresponding to a given temperature. Therefore, if the two said chambers are subjected to two different temperatures, their relative pressures will be different and any increase or decrease in the temperature to which either is subjected will make a certain difference or variation in pressure between the two chambers. It is this variation or difference in pressure that I utilize by causing the variation of the pressures or the expansion and contraction of the thermostats or of the contents of the chambers to operate means for controlling the temperature of the heating surfaces by feeding a supply of water to the surface which may be approaching an injurious degree of heat. I thereby promote the efficiency and prolong the life of the steam generator.

In practice, I arrange a suitable portion of one of the said pressure chambers of my controller to lie in the path of the steam issuing from the hottest tubes or from such portions of heating surfaces necessitating control. The other chamber may be placed in the saturated steam or in the water of the drum.

Although I have illustrated my invention as utilizing the action caused by the difference in pressure of two pressure chambers, it is obvious that I may use any other thermostat, as for instance, one in which a coaction is obtained by the unequal expansion of different metals, and my invention lies in the utilization of the energy or force developed by the difference in pressure or expansion and contraction of two thermostats subjected to different degrees of heat.

My controller is also applicable in other cases where there exists an element of danger due to over-heating the heating surfaces.

In the drawings, Fig. 18 is a partial, sectional elevation of still another modification, and Fig. 19 is a section on the line 19—19 of Fig. 18; Fig. 20 is a fragmentary, partial elevation of still another modification, and Fig. 21 is a section on the line 21—21 of Fig. 20. Like characters designate like parts in the several views.

Figure 1:
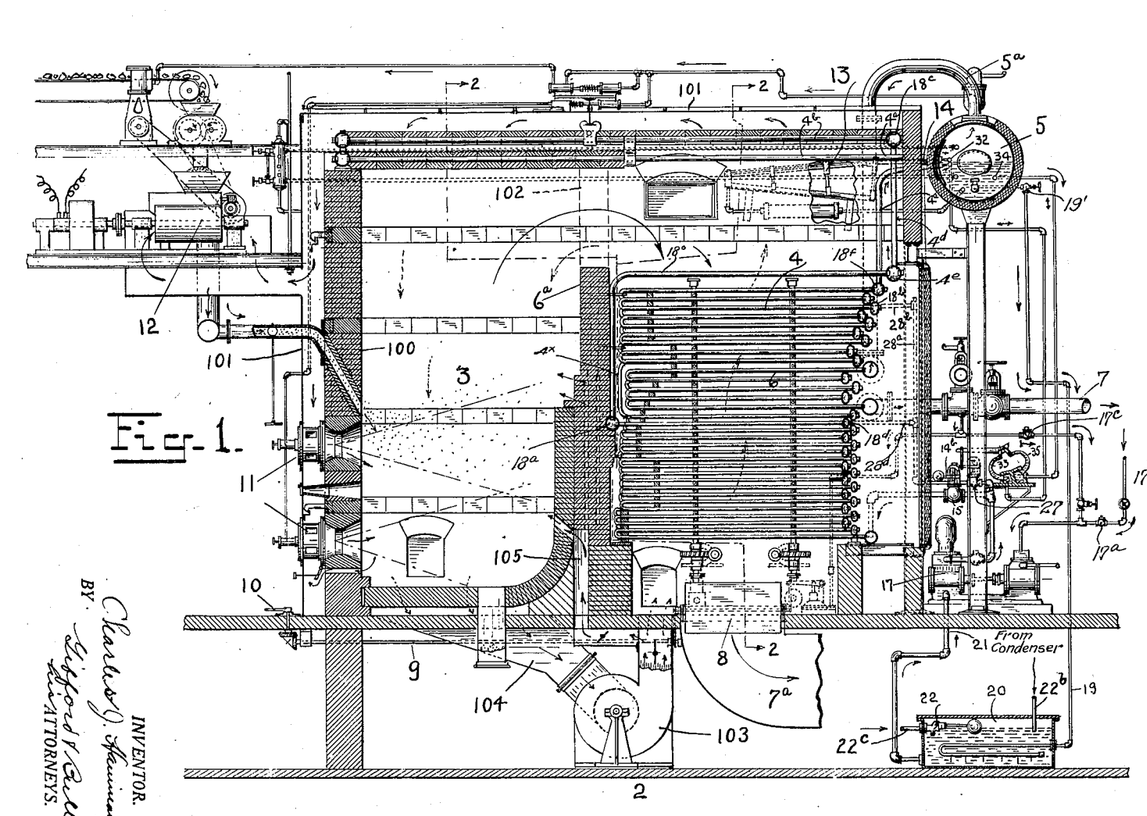
Fig. 1 is a vertical cross section of a flash boiler with small diameter tubes, with one form of my temperature controller applied thereto.
Figure 2:
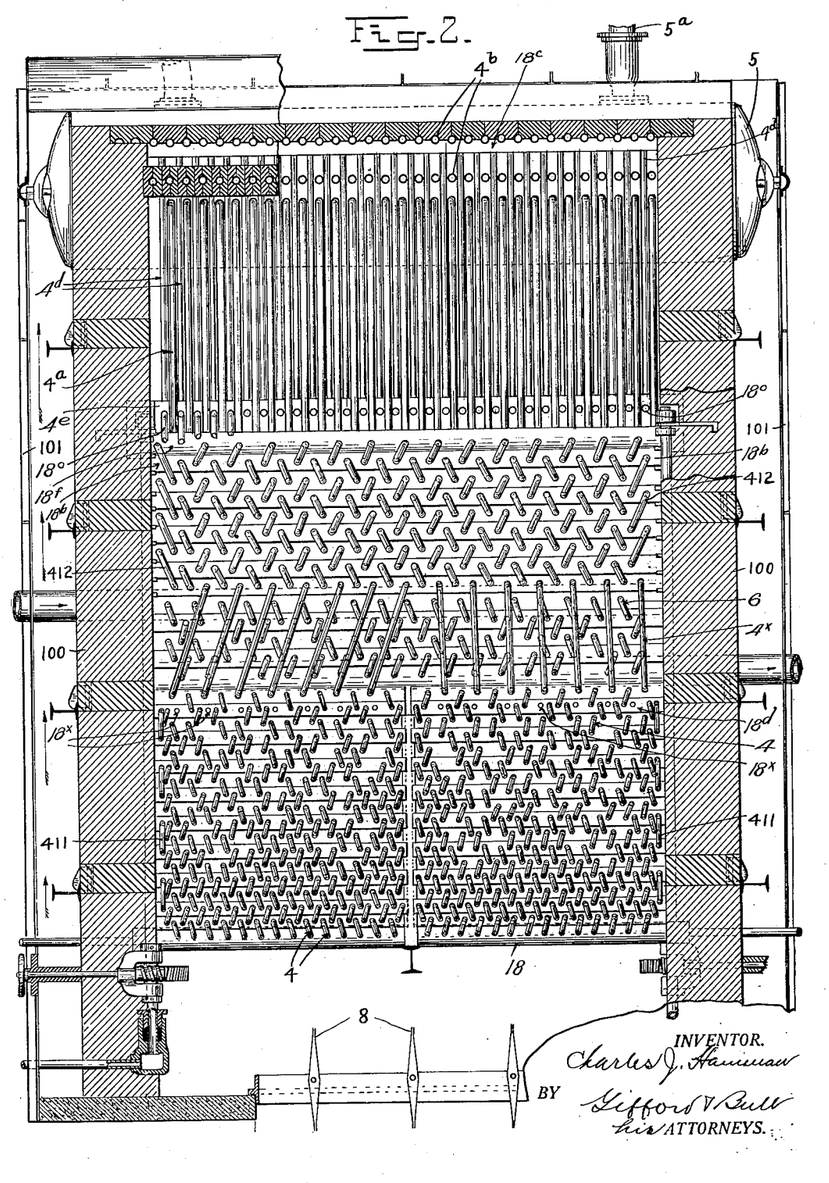
Fig. 2 is an enlarged cross section on the line 2—2 of Fig. 1 with certain parts omitted.

Referring particularly to Fig. 1, 2 is a steam generator having a furnace 3, a series of horizontal steam generating U-tubes 4 connected by nipples 4ª expanded in a steam and water drum or reservoir 5. The tubes 4 are connected to the headers, as shown best in Fig. 2, so that water entering the lowermost header 18 flows upwardly through the successive rows of U-tubes and headers. The drum has a steam outlet 5ª through which the steam passes to superheater 6 and thence through outlet pipe 7 to be utilized as desired.

In this boiler, the gases travel from the furnace 3 upwardly and over a bridge wall 6ª and thence downwardly over tubes 4 and to the stack through flue 7ª. The said flue is equipped with a damper 8 which may be automatically operated, or manipulated by means of shaft 9 and lever 10. The furnace may be provided with oil burners 11 or a pulverized fuel apparatus 12 or with both, as shown.

The air supplied to the furnace is preferably preheated. For this purpose, the setting 100 of the boiler is surrounded at the sides, front and top by a casing 101 spaced from the setting, the space between the side walls and the enclosing casing being divided by vertical walls 102 (one of which is indicated by dotted lines in Fig. 1) into front and rear portions. Air is forced by a fan 103 from an inlet pipe 104 to the space between the side walls and the casing at the rear of the wall 102, a portion of the air flowing through a passage 105 to the furnace chamber, the general direction of the air being indicated by arrows. The main portion of air passes upwardly and over the walls 102 to the oil burners 11, or to the powdered fuel apparatus 12, or to both, as required.

In the form of boiler illustrated, the series of tubes is made up of U-tubes connected into headers, the lower headers, as shown in Fig. 2, being divided into two banks across the boiler, and the upper headers being continuous across the boiler. The series of tubes is arranged so that the total area for the passage of steam and water gradually increases from the bottom to the top and the tubes themselves are so arranged in size and number that the flow areas for the gases gradually decrease from the top to the bottom. Thus, the steam and water space in the boiler increases in the direction of flow of the steam and water to accommodate the increasing volume as steam is generated in the tubes, and the gas flow areas decrease in the direction of flow of the gases, so that the areas are relatively large for the hottest gases and relatively small for the cooled gases. This arrangement of the tubes is best shown in Fig 2, and it will also be noted that I have provided some tubes, as 411 and 412, which connect headers which are not adjacent to each other. These special tubes are provided to insure a better circulation, but are no part of my invention, so that further description thereof will be unnecessary. In the illustrative embodiment, in addition to the steam generating U-tubes 4, I have provided a set of steam generating roof tubes 4ᵇ with their ends 4' connected to the drum 5 just above the nipples 4ª.

In connection with my controller I have shown in the drawing a device for regulating the main feed water supply. This regulator may be of any desired design and the one shown in the drawing and indicated by the reference character 13 is a well known regulator governed by the variation of the water level in a drum. This form of main feed regulator is provided with an arm 14 connected to a control valve 15 having a weighted arm. The said valve is located upon a main feed pipe 16 between a pump 17 and the lowermost header 18 of the boiler tubes. When the water in the drum falls below a safety level the arm 14 is raised and operates to lift the arm of the valve and admit more water to the tubes, it being understood that the said valve is arranged to permit a predetermined minimum quantity of water to flow continually into the tubes, and this main feed regulator operates to vary the amount of water supplied above the fixed quantity.

The said pump 17 is shown in the drawing in the form of a steam-operated pump which receives steam from the drum by means of pipes 17$^a$ and 13$^b$. The pump may however be operated from another steam source by means of steam inlet pipe 17$^b$.

The steam inlet 17$^b$ may be used to operate the pump in starting up the boiler, and check valve 17$^c$ prevents the steam from passing to the drum. The pump may be operated in this manner until sufficient steam is generated in the boiler to operate the pump 17 in which case the check valve 17$^d$ will close and check valve 17$^c$ open, as is common in check valves used for this purpose.

A branch water pipe 15$^a$ is also shown, whereby a reserve supply of water may be had in case the pump should at any time be out of working order.

In the steam generator shown, the drum 5 is a reservoir to collect the surplus water carried into the drum by the steam-generating tubes. A certain part of this surplus water is drawn off by means of pipe 19, the valve 19′ in which is normally left partly open to permit a substantially continuous flow of water from the drum 5 into a tank 20, the surplus water becoming part of the feed water. The main feed supply enters the tank 20 from a condenser or other source of supply through pipe 22$^b$ and the pump through pipe 21. The necessary make-up water is supplied through the pipe 22$^c$ from any suitable source and such supply is governed by float valve 22.

In the operation of series boilers intended to evaporate all or substantially all of the water fed thereto, there is difficulty in regulating the amount of feed water in synchronism with sudden changes in operating conditions so as to prevent some of the tubes from becoming overheated. It has been found necessary to do something to prevent tubes from being burned out, and the arrangement here is to make provision for supplying water to the tubes at a point beyond that where feed water normally enters the first tube in the coldest gases.

This by-passing of extra water into the hot sections of the boiler is controlled by a temperature-actuated device located in a steam and water drum so as to act cooperatively with the arrangement for control of the main water feed which is actuated by the level of water in the same steam and water drum.

The drawing off of surplus water from this steam and water drum through pipe 19 is limited to the smallest practicable amount incident to the operation of the controller, and as a means of preventing an indefinite rise of level, a slight excess of water is delivered with the steam normally acting to prevent an indefinite fall of level. Such small amounts of water as are thus drained off as an incident to level control are recirculated to conserve the heat.

The pump 17 operates to force water through pipe 23 upwardly and over the bend 24 and through pipe 25 and feed water regulating valve 15 into the header 18 connected with the lower tubes. This arrangement of piping or duct (shown best in Fig. 3) leading from the pump to the lower header of the steam generating tubes provides a water seal to prevent the possible draining of the boiler when the boiler is not in operation.

Figures 3, 4, 5:
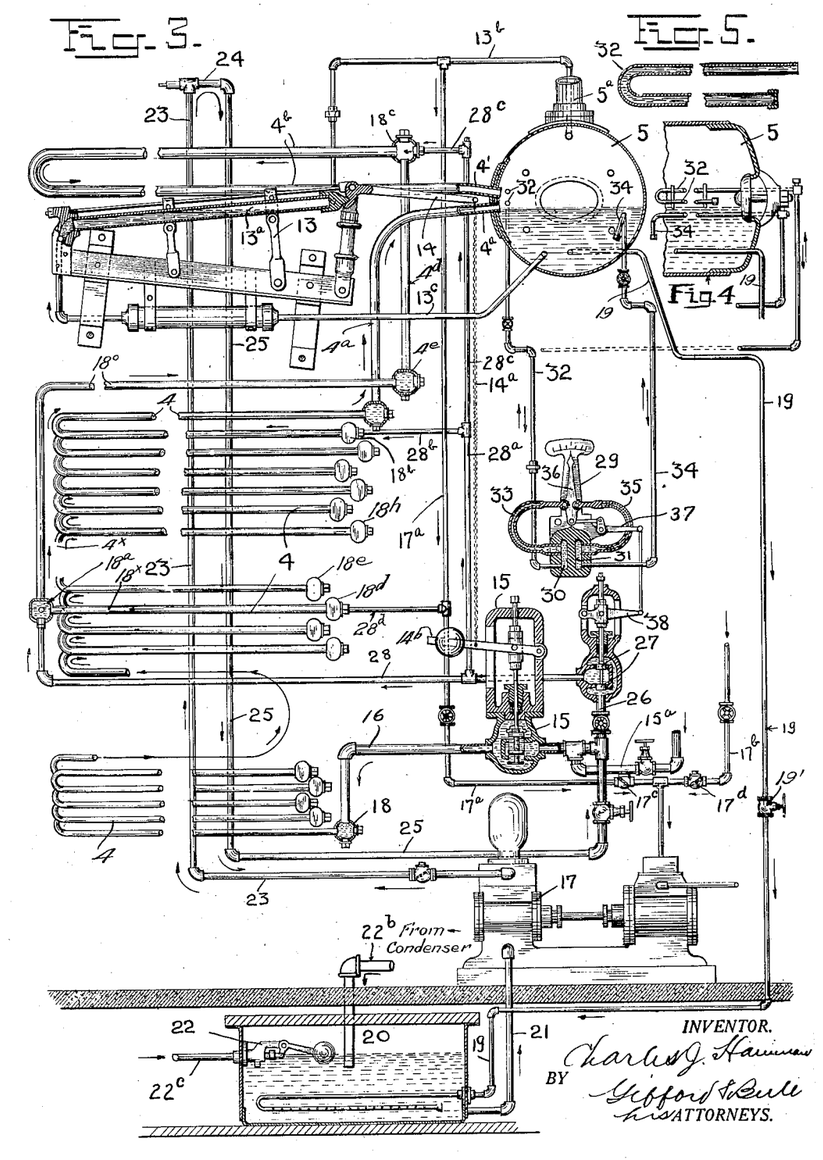
Fig. 3 is a more or less diagrammatic view of one form of my invention with some of the boiler parts and with some of the tubes at the lower portion of the series boiler broken away.
Fig. 4 is a fragmentary sectional elevation of one part of Fig. 3.
Fig. 5 is an enlarged detail of Fig. 3.

By forming the connection or duct between the pump 17 and tubes 4 with pipes 23 and 25 to form a loop 24, it will readily be seen that when the pump 17 is not working, the water in the pipe 23 may drain into the tank, but the water from the boiler system will not pass the loop 24 which is just above the water level of the boiler. This avoids the danger of accidentally starting the fires when no water is in the boiler tubes.

The main feed water regulator 13 is composed of a chamber 13$^a$ connected to the steam space of the drum 5 by pipe 13$^b$ and to the water of the drum by means of pipe 13$^c$. Thus, if the surplus water from the tubes is less than the quantity drained to the tank 20, the water in the drum 5 lowers and the water in the regulator 13 diminishes. The regulator chamber is then filled with a greater quantity of steam, the temperature of which causes the chamber to expand and raise the lever 14. This lever is connected, by means of chain 14$^a$, to lever arm 14$^b$ on the control valve. Therefore the upward movement of the lever arm of the valve opens the valve and the water supply to the tubes is increased. When the water rises in the drum the inverse action of the regulator is effected.

This regulation of the main feed supply, although necessary, will not act quickly enough to bring water to the hot tubes 4 in time to prevent their burning when the steam therein reaches a high and unsafe temperature.

To prevent the steam reaching a dangerous temperature, I provide the pipe 25 leading from the pump 17 with a by-pass 26 connected to a balanced control valve 27, and leading from this control valve is provided a supplemental feed water pipe 28 connected to an intermediate header 18$^a$, a vertical supplemental pipe 28$^a$, connecting valve 27 through pipes 28$^d$, 28$^b$ and 28$^c$, respectively, with headers 18$^d$, 18$^b$ and 18$^c$, the latter being connected to the roof tubes 4$^b$.

As a means of operating the valve 27 to give a supplemental feed of water, I provide a controller 29 composed of closed chambers 30 and 31 which may be filled with any volatile liquid. The chamber 30 is shown as comprising a closed tube 32 and a flexible U-tube 33, while chamber 31 comprises a tube 34 and a flexible U-tube 35. Preferably the upper end of tube 32 is bent, as shown best in Fig. 5.

One end of the tube 32 of the chamber 30 is placed in such position as to be affected by any superheated steam that may flow out of the hottest tubes 4$^a$ or 4' into the drum 5, and one end of the tube 34 of chamber 31 is preferably immersed in the water in drum 5. It may, however, be placed in any part of drum 5, so that it is removed some distance from the outlet of the pipes 4$^a$ and 4'.

So long as the temperatures of the tubes 32 and 34 are the same, the pressures in chambers 30, 31 will be the same and there will be no change in conditions. Thus, so long as saturated steam is issuing from pipes 4$^a$ and 4' all parts of the drum 5 will have the same temperature, because the temperature of the water in the drum 5 is that of the saturated steam entering it.

If, however, because of insufficient water in the tubes 4, the steam issuing from pipes 4$^a$ becomes superheated, then the temperatures of tube 32, which lies directly in the path of this superheated steam, will be higher than that of the water in drum 5 and tube 34 immersed therein. Increase of pressure in chambers 30, 31 will tend to straighten tubes 33, 35. So long as the pressures in the two chambers are the same, these tendencies are balanced and no motion takes place. When pressure in chamber 30 becomes greater than that in chamber 31, as in the case just stated, this balance is destroyed, and arm 36 will be moved clockwise. Through its connection to bell crank 37 and lifting arm 38, this opens valve 27 to admit water from pipe 26 to headers 18$^a$, 18$^b$ and 18$^c$ and thus to the boiler tubes 4. This will give saturated steam from tubes 4$^a$, when the pressures in chambers 30, 31 will again be equalized and valve 27 closed. The main feed valve 15 gives a continuous feed. Similarly, if the steam issuing from the pipes 4' is superheated, the effect will be the same as when superheated steam issues from the pipes 4$^a$.

It will be noted that the extent of opening of valve 27 will depend on the amount of the difference in pressure in the two chambers 30, 31, which, in turn, is dependent on the amount of the difference between the temperature of the steam generated and that of the boiler water. Thus, the amount of supplemental feed water supplied will correspond to the difference in temperatures of the tubes 32, 34.

The operation of the arrangement illustrated in Figs. 1 to 5 is as follows:

Water is normally forced by the pump 17 through pipes 23, 24 and 25 to the valve 15 by which the flow into the pipe 16 and header 18 is controlled. From the header 18, the water flows through the row of U-tubes 4 connected to header 18 into the next higher header, and from thence through successive rows of U-tubes into successively higher headers until the header 18$^d$ is reached, this header 18$^d$ terminating the lower section of the boiler which functions more or less as an economizer section. The header 18$^d$ has a series of U-tubes 4 connecting it with the header 18$^e$ and some of the water from the header 18$^d$ flows into the header 18$^e$ and from thence through U-tubes 4$^x$ with a large bend to provide a space for the superheater tubes 6, if such a superheater is used, the U-tubes 4$^x$ being connected to a header 18$^h$. From the header 18$^h$, the water again flows successively through U-tubes 4 and successively higher headers until the header 18$^f$ is reached, when the water and steam enters the tubes or nipples 4$^a$ from which it flows into the drum 5.

Some of the water from the header 18$^d$ flows through tubes 18$^x$, to a header 18$^a$, and from thence through tubes 18$^c$ to a header 4$^e$ and tubes 4$^d$ to a header 18$^c$ where it enters the roof tubes 4$^b$, the steam and water from these roof tubes being delivered through the ends 4' to the drum 5.

Normally, therefore, the boiler water flows upwardly through the lowermost tubes 4 until the header 18$^d$ is reached, from which point branches two paths, one through the remainder of the steam generating tubes 4 to the drum 5, and the other through the roof tubes 4$^b$ to the drum 5, the normal flow of the water into the lower header 18 being controlled by the valve 15, which, in turn, is controlled by the water level in the drum 5.

If the operating conditions are such that the water in either the tubes 4 or 4$^b$ becomes superheated, then superheated steam will be delivered either from the tubes 4$^a$ or 4' against the closed tube 32, and this will cause the valve 27 to be opened to deliver water to the more highly heated portions of the boiler through the headers 18$^a$, 18$^d$, 18$^b$ and 18$^c$. It will be understood that in the arrangement described, the desired end is to prevent the delivery of superheated steam to the drum 5, such delivery being an indication that some of the steam generating tubes are dry. While it would be possible to arrange the boiler so that water would be delivered only to such tubes as are dry, the arrangement shown in Figs. 1, 2 and 3 is sufficient for the purpose and greatly simplifies the arrangement, it being obvious that the chief effect of turning water into tubes which are not dry will be to increase the quantity of water delivered to the drum 5.

By introducing the supplemental water supply at intermediate points of the boiler makes the device much more sensitive and effective than would be the case if such supplemental water were added to the normal supply entering the lower part of the boiler. In the arrangement described, such supplemental water is brought at once into contact with the surfaces of the boiler most liable to be overheated without having to flow through the lower part of the boiler. Furthermore, such supplemental water supply is cooler than the water which is passed through the lower section of the boiler and is thus more effective in cooling the heated surfaces than would be the water from such lower portion.

It will be understood that, if desired, the roof tubes $4^b$ may be omitted, but that if such roof tubes are used, such tubes, in the arrangement illustrated, would be subjected to relatively high heat and must be protected in the same manner as the upper tubes 4 of the series boiler proper. Moreover, it will be understood that a condition which will result in the tubes $4^b$ becoming dry will usually also result in some of the upper tubes 4 becoming dry. In any event, however, it is immaterial to the operation which of these sets of tubes becomes dry, because the delivery of superheated steam against any part of the tube 32 will open the valve 27 and deliver cooling water to the overheated tubes, in the arrangement described, such cooling water also being delivered to other portions of the boiler which may not be overheated, but such additional cooling water not materially affecting the operation of the boiler.

Figures 6, 7, 8:
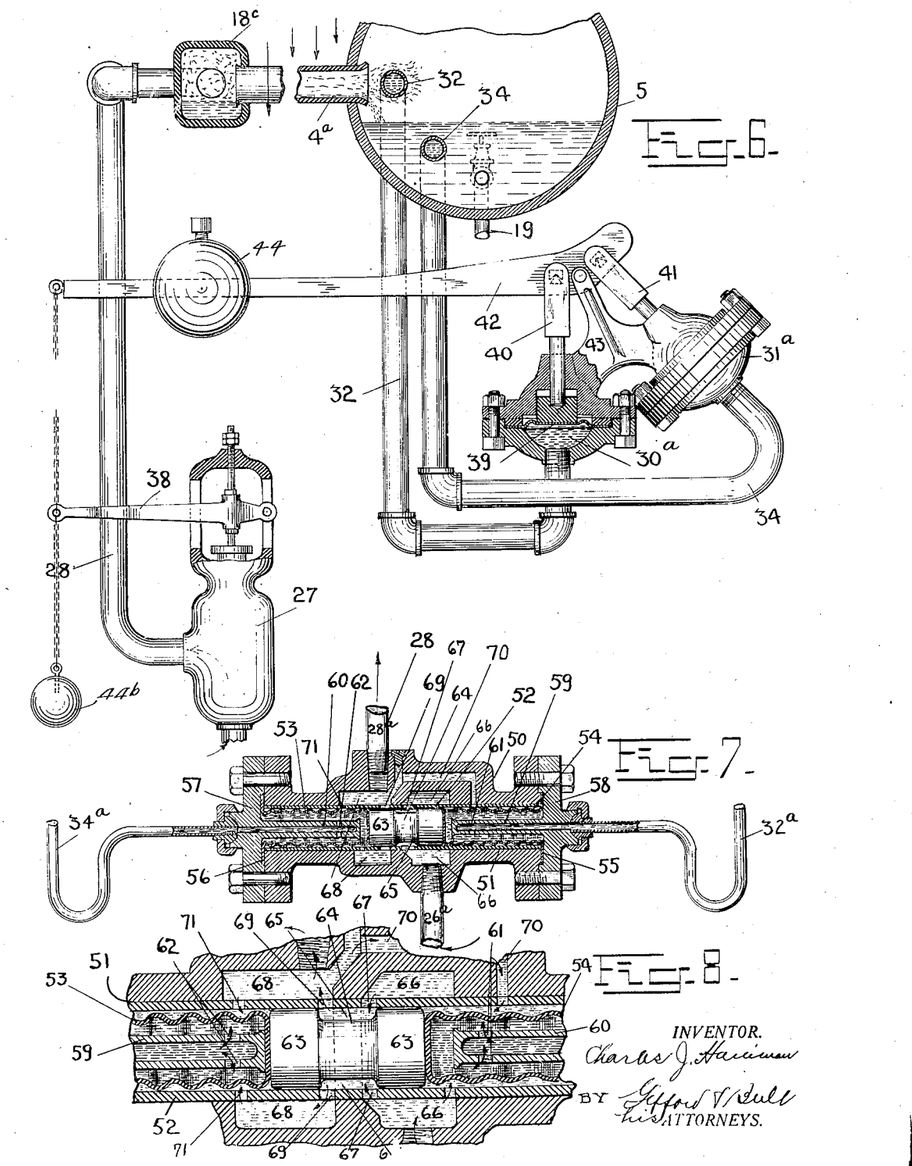
Fig. 6 shows a modification.
Figs. 7 and 8 are two sectional elevations of another modification, with the parts in different positions.

In Fig. 6 another form of temperature controller is shown. In this form, one end of each of the chambers $30^a$, $31^a$, connected to tubes 32 and 34 respectively, is closed by a diaphragm 39 in contact with movable stems 40 and 41 respectively. These stems are arranged to bear against lugs on opposite arms of a double arm lever 42. This lever is pivoted on a bearing 43 and held in a normal position by means of an adjustable weight 44 upon one arm and is connected to lifting arm 38 of the valve 27 by a chain, as shown. A weight $44^b$ may be provided to insure the closing of valve 27.

In this form of controller, the action is similar to that shown in Fig. 3 except that, while the chamber $30^a$ is closed, and contains a volatile liquid, the chamber $31^a$ is open to the water in the drum 5 and is consequently occupied by the drum water. The result is also the same, since a difference of pressure acts to open the supplemental feed water valve 27.

A preferable form of construction for my controller is shown in Figs. 7 and 8.

This controller is formed of a casing 50 having a central cylindrical bore or aperture 51 into which is inserted a barrel or sleeve 52.

Within the casing and at opposite ends thereof are located two cylindrical and corrugated shells or elastic members 53 and 54, closed at one end and having flanges 55 and 56 at their open ends. When the shells are in place within the casing, end flanges 57 and 58 are clamped to companion flanges of the casing in such manner as to secure the shells in position substantially on the axial line of the casing but free from contact with the sides of the aperture.

Integral with the end flanges 57 and 58 are hollow stems 59 and 60 having openings 61 and 62 to give a connection between the interior of the stems and the chambers. The said stems are connected to tubes $32^a$ and $34^a$ which are closed and which, in conjunction with the shells 53 and 54 respectively, make two complete pressure chambers. The increase or decrease of temperature affecting the said chambers, or a portion of the said chambers, therefore causes the elastic members to expand or contract.

Between the closed ends of the shells and movably located within the sleeve 52 is a piston 63 having thereon a centrally located peripheral groove 64 which, in cooperation with the sleeve 52, forms a passage 65.

At one side of the casing is connected the pipe $26^a$ through which a supply of feed water is pumped into an annular passage 66 within the casing, and around the peripheral groove of the piston, connection being provided through the sleeve by means of a plurality of ports 67. Feed water pipe $28^a$ connects with an annular passage 68 between the sleeve and the casing.

When the pressures in the two shells are equal or when the steam in the upper or hottest tubes is at a safe temperature, the piston 63 will be in a neutral position as shown in Fig. 7, with the connection between pipes $26^a$ and $28^a$ closed by reason of the body of the piston 63 being opposite ports 69.

Assuming, in this case, that the end of the pipe $32^a$ is in the path of the steam issuing from the hottest tubes as $4^a$ in Figs. 3 and 6, and that such steam is reaching an unsafe degree of heat, the elastic member or shell 54, being then subjected to a greater pressure than the shell 53, will expand and move the piston to the position shown in Fig. 8. The ends of the stems 59 and 60 serve as stops for the piston and prevent the piston 63 from compressing either shell more than necessary.

The water may then pass from the pipe $26^a$ and chamber 66 around the groove 64 of the piston 63 and through the ports 69 in the sleeve 52 and through the pipe $28^a$ to the various overheated tubes or portions of heating surfaces of the steam generator, in the manner previously described. When the piston is in a neutral position, the openings 69 are closed but the boiler feed water always occupies the passage 68 by reason of its connection with pipe $28^a$. Passage 68 is also connected by a by-pass 70 with the outer side of the shell 54.

The outer side of the shell 53 is also open to the passage 68 through a plurality of holes 71 in the sleeve. By this means, uniform pressure is maintained around the outer sides of both shells, such pressure being equal to that of the water in the steam-generating tubes.

Thus, if the boiler pressure is 600 lbs. and the pump pressure is 700 lbs. it will only be necessary for the pressure in the shell 54 to rise slightly above 600 lbs. to expand the shell 54 and move the piston 63 to give a supplemental supply of water to the heating surfaces. The pressure within and without the shells 53 and 54, under normal conditions, will be equal.

This is of considerable advantage for the reason that, by this arrangement, the shells 53 and 54 cannot be subjected to an excessive strain and may be arranged to operate with only a slight difference of pressure.

A further advantage of the valve shown in Figs. 7 and 8 lies in the elimination of valves and stuffing boxes with their varying frictions or other unions which may be subject to leaks.

It will be observed that, by my controller, I am enabled to prevent any of the tubes from becoming overheated and at the same time, I can operate the boiler through any range of temperatures without the controller operating, so long as saturated steam is generated. If a single temperature-controlled device were used to control the cooling of the tubes, it would be necessary to reset such device for each temperature at which it may be desired to operate the boiler. With my device, the tubes are not flooded, no matter what the range of temperatures may be, unless and until there is so little water in the tubes that the steam generated changes from saturated to superheated.

While the arrangements which I have heretofore described are my preferred form, it will be possible, under certain circumstances, to use an arrangement which in some respects is not so elaborate as my preferred forms, by which supplemental feed water may be injected into tubes which have become too hot by reason of all of the water having passed into steam before reaching the end of the series.

Figures 9, 10:
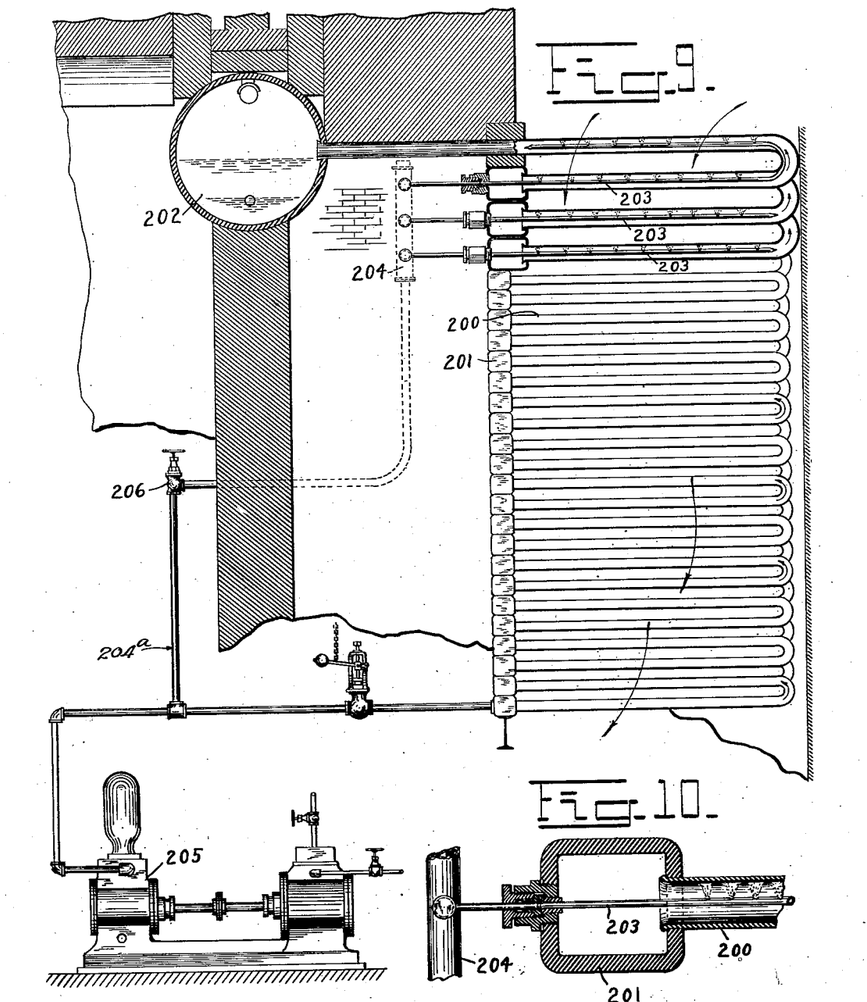
Fig. 9 is a fragmentary elevation, partly in section showing still another form of a device for cooling the hottest of the series of tubes of a flash boiler.
Fig. 10 is a fragmentary, enlarged cross section of a portion of Figure 9.

In Figures 9 and 10 I have illustrated an arrangement whereby the tubes in the high temperature gases are continuously supplied with any predetermined quantity of supplemental feed water as may be found necessary to prevent overheating of the boiler tubes.

In the form illustrated, the boiler is provided with a series of tubes 200 fixed in headers 201, the end tubes of the series communicating with the drum 202. This arrangement in general is the same as that shown in Figure 1 with the relative location of the parts somewhat different. Passing through the uppermost headers and secured by suitable glands or packings arranged to resist the steam pressure, are supplemental feed pipes 203 each extending into one of the uppermost tubes of the series. Each of these tubes communicates with a manifold 204 which, in turn, is connected by by-pass 204ª with a pump 205, this pump being the same one which supplies the normal feed to the lowermost tubes of the series.

Located between the supplemental feed pipes 203 and the pump 205 is a throttle valve 206. The pump gives a continuous supply of water to the boiler through the pipes 203 and such supply may be regulated by means of the said valve. The quantity of water necessary to keep the boiler tubes at a safe temperature may be determined by experiment or by known furnace or operating conditions and the throttle valve may be set to give any necessary percentage of supplemental feed water.

Any number of the boiler tubes 200, as desired, may be provided with the supplemental feed pipes 203.

Figure 11:
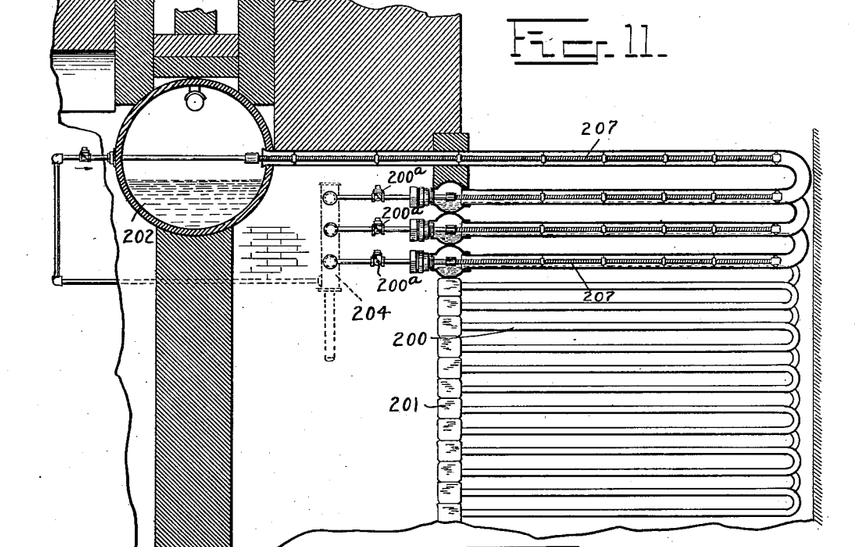
Fig. 11 is another modification similar to that shown in Figure 9 but with a different arrangement of the cooling devices.
Figures 12, 14:
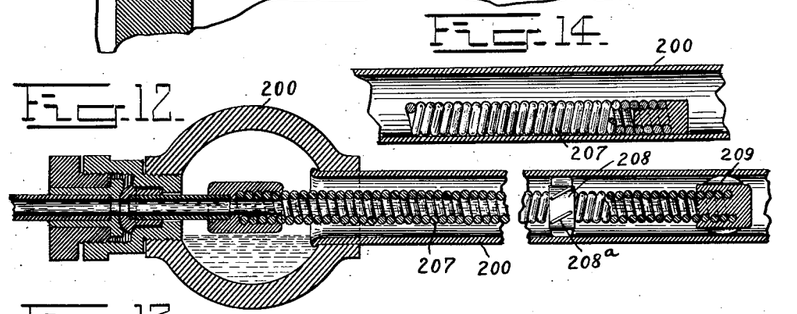
Figs. 12 and 13 are cross sections showing the arrangement shown in Figure 11 in two different stages of operation.
Fig. 14 is a fragmentary sectional elevation showing a modification of the arrangement shown in Fig. 11.
Figure 13:
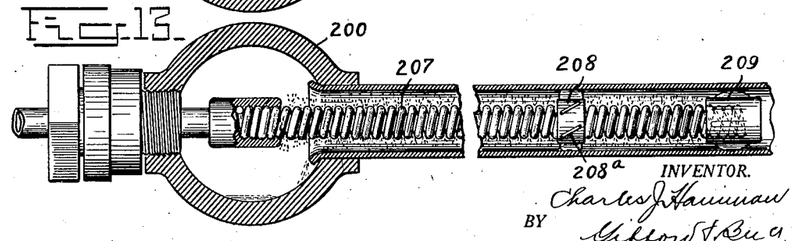

In Figures 11, 12 and 13 I have shown an arrangement similar to that shown in Figure 9, but constructed so that the supplemental feed water will be supplied automatically when the boiler tube becomes overheated due to the absence of water therein.

In the form illustrated in these figures, the supplemental feed water is contained in an expansible tube 207 which, in the form shown, is made up of a wire coil or helical spring having sufficient internal tension so as to form a normally closed tube.

The tubes 207 are connected to the manifold 204 into which the supplemental feed water is forced by means of pump 205.

The supplemental feed water tubes are thus normally filled with water; the pump pressure is not, however, sufficient to expand the coil and release the water. When the boiler tubes do not receive enough water, from the main pump feed line, the steam therein becomes superheated and the water in the pipe or tube 207 will receive heat from the superheated steam and the pressure within the tube 207 will be increased, causing the spring to expand and the coils to open. Water will then be ejected from the many openings between the coils and the temperature and pressure within the boiler tube will be reduced.

It is obvious that the pressure necessary to expand the coil must be greater than that supplied by the pump; check valves 200ª are therefore provided to prevent back pressure within the pump, when the pressure within the coil is increased due to the heat transferred from the boiler tube when the steam therein becomes superheated.

After the water has been discharged into the boiler tubes, and the tubes have been cooled, the spring will retract and again receive water from the pump. The same operation will be repeated when the boiler tubes again reach an unsafe temperature.

The tube 207 in the form illustrated is held central of the boiler tube by members 208. The said members may be provided with wings or lugs 208ª arranged at an angle to the axial line of the tube for the purpose of imparting a swirling motion to the passing steam, causing it to impinge against the wall of the tube and thereby increase the heat transfer rate.

In Figure 14 I have shown an arrangement similar to that shown in Figures 12 and 13, but one in which the members 208, 209 are dispensed with so that the tube 207 lies on the bottom of the tube 200.

Figure 15:
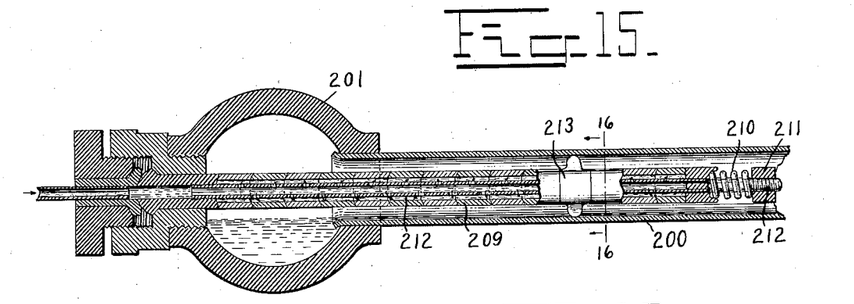
Fig. 15 is a partial, sectional elevation of a modification of the arrangement shown in Fig. 11.
Figure 16:
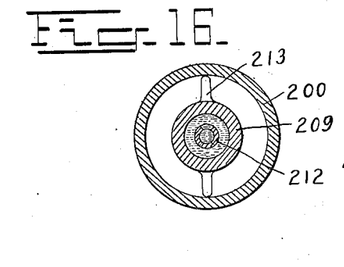
Fig. 16 is a section taken on the line 16—16 of Fig. 15
Figure 17:
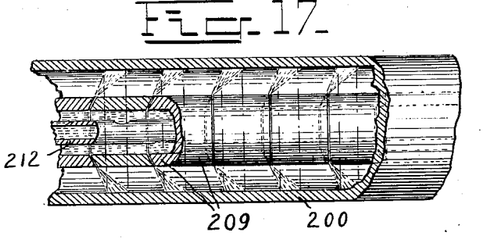
Fig. 17 is a partial, sectional elevation of Fig. 15 with the parts in a different operative position.

In Figures 15, 16 and 17 I have shown an arrangement similar to that shown in Figures 11, 12 and 13, but in which the expansible tube 209 is formed of a series of collars having concave-convex meeting surfaces. Through the centers of these collars passes a tube 212 which on its end is provided with a solid portion threaded to receive a nut 211. Between the end collar and the nut 211 is placed a spring 210 which serves to hold the meeting faces of the respective collars together to form a continuous tube which will be held central of the boiler tube 200 by the winged member 213. The tube 212 is provided with a series of holes so that the space between its exterior and the interior of the collars 209 is constantly filled with a supply of feed water. When the tube 200 becomes excessively hot, the water column in the tube 209 expands and partly turns to steam to open the joints between the collars to feed the necessary amount of water to the tube 200 to cool it, the action being similar to that described in connection with Figures 11 to 14.

Figures 18, 19, 20, 21:
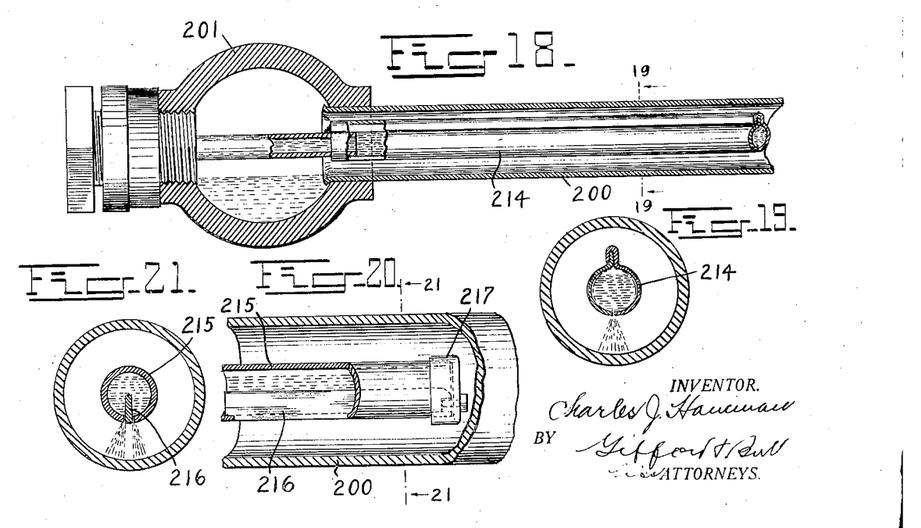

In Figures 18 and 19 is shown still another modification in which a tube 214 is constructed so that normally the two parts are held together to provide a closed tube. When the temperature of the tube 200, and therefore of the water column in the tube 214, exceeds the predetermined amount, the tube 214 will expand to open the slit at the bottom to feed the supplemental supply, the tube contracting when the boiler tube is cooled.

In Figures 20 and 21 is an arrangement similar to that shown in Figures 18 and 19, but in which the two edges of the tube 215 normally contact with a member 216 supported in the ends of the tube 215 as by a member 217. An expansion of the tube 215, due to the high heat of the tube 200, opens a space on either side of the member 216 to permit the supplemental supply to flow.

While I have illustrated my controlling device as acting to flood the boiler tubes, it will be understood that it may also be used to cool such surfaces by controlling the heat applied to the tubes in any of the well-known ways.

While the arrangements which I have shown in Figures 9 to 21, inclusive, will serve some of the purposes of the arrangement described in the preceding figures, it will be understood that preferably I use the full automatic control of the supplemental supply of feed water described in such preceding figures, because with such an arrangement the supplemental supply is not only controlled automatically, but a single device may be used to supply additional water, not only directly to the overheated tubes, but also to an intermediate stage of the boiler so as to more evenly cool the entire series of the tubes. The arrangements which I have described, however, and particularly the automatic devices in Figures 11 to 21, will accomplish many of the results attained by my balanced thermostatic control, and, because of their greater simplicity, will be the preferred form to be used under certain operating conditions.

I claim:

1. The method of operating steam boilers which consists in forcing a main supply of feed water into the boiler continuously and in forcing a supplemental supply into the boiler whenever the steam in the boiler becomes superheated, the supplemental supply being forced into that part of the boiler where superheated steam is generated.

2. The method of operating steam boilers which consists in forcing a main supply of feed water into the boiler continuously and in forcing a supplemental supply into the boiler whenever the steam in the boiler becomes superheated, the supplemental supply being forced into that part of the boiler where superheated steam is generated.

3. The method of operating steam boilers which consists in forcing a main supply of feed water into the boiler continuously and in forcing a supplemental supply into the boiler whenever the steam in the boiler becomes superheated, and in quantities proportionate to the degree of superheat, the supplemental supply being forced into that part of the boiler where superheated steam is generated.

4. The method of controlling the temperature of the heating surfaces of a steam boiler, which consists in providing a supply of a cooling medium for said surfaces and admitting said cooling medium to said surfaces only while a difference in the temperature of the boiler water and the steam generated in the boiler exists.

5. The method of controlling the temperature of the heating surfaces of a steam boiler, which consists in providing a supply of a cooling medium for said surfaces, placing a thermostat in the steam generated by the boiler and another thermostat in the boiler water, and admitting said cooling medium to said surfaces only while a difference in temperature in the two media exists.

6. The method of controlling the temperature of the tubes of a steam boiler which consists in providing a supplemental supply of feed water for the tubes and admitting such water to the tubes only while a difference in the temperatures of the boiler water and the steam generated in the boiler exists.

7. The method of controlling the temperature of the tubes of a steam boiler which consists in providing a supplemental supply of feed water for the tubes and admitting such water to the tubes only while a difference in the temperatures of the boiler water and the steam generated in the boiler exists, and in proportion to such difference.

8. In a boiler temperature-controlling device, means to reduce the temperature of the boiler heating surfaces, a thermostat subjected to the temeprature of the steam generated in the boiler, a thermostat subjected to the temperature of the boiler water, each of said thermostats being constructed and arranged to balance the pressure of the other thermostat while both thermostats are subjected to the same temperature said thermostats being connected to said means so as to operate said means only when the temperature of one thermostat is higher than that of the other.

9. In a steam boiler, means to reduce the temperature of the boiler heating surfaces and means to control the operation of said first-named means, constructed and arranged to be actuated by a difference in the temperature of the steam generated in the boiler and that of the boiler water.

10. In a steam boiler, means for feeding water continuously through said boiler, and a heating surface cooling device connected intermediate the water inlet and steam outlet of said boiler and a controlling device for said cooling device constructed and arranged to permit said cooling device to operate only when superheated steam is generated in said boiler.

11. In a steam boiler, means for feeding water continuously through said boiler, and a heating surface cooling device connected intermediate the water inlet and steam outlet of said boiler and a controlling device for said cooling device, constructed and arranged to hold said cooling device inoperative while saturated steam is generated in said boiler and to permit said cooling device to operate when superheated steam is generated in said boiler.

12. In a steam boiler, means to admit a cooling medium to the heating surfaces of the boiler, two thermostats connected to said means, the first thermostat being subjected to the temperature of the steam generated in the boiler and connected to said first-named means so as to admit the cooling medium to the tubes when the steam temperature increases and the second thermostat being subjected to the temperature of the boiler water and connected to said first-named means so as to shut off the cooling medium as the water temperature increases relative to the steam temperature.

13. In a steam boiler, means to admit a cooling medium to the heating surfaces of the boiler, a first thermostat subjected to the temperature of the steam generated in the boiler and connected to said first-named means so as to admit the cooling medium to the tubes when the steam temperature increases and a second thermostat subjected to the temperature of the boiler water and connected to said first-named means so as to shut off the cooling medium as the water temperature increases, said thermostats being balanced against each other so that equal increases of temperature in each will hold said first-named means inoperative, and unequal increases of temperature will cause said means to operate.

14. In a steam boiler of the series type comprising boiler tubes through which the water is passed in series, means to supply feed water at one end of the series, supplemental means for introducing feed water to said boiler tubes at an intermediate point in the series, and means independent of the boiler pressure for establishing the flow of water to said tubes at said intermediate point when said tubes become too hot.

15. In a steam boiler of the series type comprising boiler tubes through which the water is passed in series, means to supply feed water at one end of the series, supplemental means for introducing feed water to said boiler tubes at an intermediate point in the series, and automatic means independent of the boiler pressure for establishing the flow of water to said tubes at said intermediate point when said tubes become too hot.

16. In a steam boiler of the series type comprising boiler tubes through which the water is passed in series, means to supply feed water at one end of the series, supplemental means for introducing feed water into the tubes at the hotter end of the series, and means independent of the boiler pressure for operating said supplemental means when said tubes become too hot.

17. In a steam boiler of the series type comprising boiler tubes through which the water is passed in series, means to supply feed water at one end of the series, supplemental means for introducing feed water into the tubes at the hotter end of the series, and automatic means independent of the boiler pressure for operating said supplemental means when said tubes become too hot.

18. In a steam boiler of the series type comprising boiler tubes through which the water is passed in series, means to supply feed water at one end of the series, supplemental means for introducing feed water into the tubes at the hotter end of the series, and means controlled by the temperature of said end tubes for controlling said supplemental means.

19. In a steam boiler of the series type comprising boiler tubes through which the water is passed in series, means to supply feed water at one end of the series, supplemental means for introducing feed water to said boiler tubes at an intermediate point of the series, and means responsive to the temperature of the fluid issuing from said tubes for controlling the flow of water to said tubes at said intermediate point.

20. In a steam boiler of the series type comprising tubes through which the water is passed in series, means to supply feed water at one end of the series, means for introducing supplemental feed water at an intermediate point of said series, and means comprising two thermostats for controlling the flow of water to said intermediate point of the series, one of said thermostats being subjected to the temperature of the steam issuing from said tubes and the other to the temperature of the boiler water.

21. In a steam boiler of the series type comprising tubes through which the water is passed in series, means to supply feed water at one end of the series, means for introducing supplemental feed water at an intermediate point of said series, and means comprising two pressure chambers for controlling the flow of water to said intermediate point of the series, one of said pressure chambers being subjected to the temperature of the steam issuing from said tubes and the other to the temperature of the boiler water.

22. In a steam boiler of the series type, comprising tubes through which the water is passed in series, means to supply feed water at one end of the series, a supplemental feed water supply pipe connected at an intermediate point in the series, a valve in said pipe, a thermostat subjected to the temperature of the steam generated in said boiler and a thermostat subjected to the temperature of the boiler water, each of said thermostats being connected to said valve in opposed relation to hold said valve closed when both thermostats are subjected to the same temperature, and to open said valve when the steam generated is hotter than the boiler water.

23. In a steam boiler of the series type, comprising tubes through which the water is passed in series, means to supply feed water at one end of the series, a supplemental feed water supply pipe connected at an intermediate point in the series, a valve in said pipe, a thermostat subjected to the temperature of the steam generated in said boiler and a thermostat subjected to the temperature of the boiler water, each of said thermostats being connected to said valve in opposed relation to hold said valve closed when both thermostats are subjected to the same temperature, and to open said valve when the steam generated is hotter than the boiler water, the opening of said valve being proportional to the difference between the temperatures of the steam and the temperature of the water.

24. In a steam boiler of the series type, comprising tubes through which the water is passed in series, means to supply feed water at one end of the series, a supplemental feed water supply pipe connected at an intermediate point in the series, a valve in said pipe, a pressure chamber subjected to the temperature of the steam in said boiler, a pressure chamber subjected to the temperature of the boiler water, connections between said chambers and said valve constructed and arranged to hold said valve closed when both chambers are subjected to the same temperature, and to open said valve when the steam generated is hotter than the boiler water.

25. In a steam boiler of the series type, comprising tubes through which the water is passed in series, means to supply feed water at one end of the series, a supplemental feed water supply pipe connected at an intermediate point in the series, a valve in said pipe, a pressure chamber subjected to the temperature of the steam in said boiler, a pressure chamber subjected to the temperature of the boiler water, connections between said chambers and said valve constructed and arranged to hold said valve closed when both chambers are subjected to the same temperature, and to open said valve when the steam generated is hotter than the boiler water, the opening of said valve being proportional to the difference between the temperatures of the steam and the temperature of the water.

26. In a steam boiler of the series type, comprising tubes through which the water is passed in series, means to supply feed water at one end of the series, a supplemental feed water supply pipe connected at an intermediate point in the series, a valve in said pipe, and a controlling device for said valve, constructed and arranged to open said valve automatically when superheated steam is generated in said boiler.

27. In a steam boiler of the series type, comprising tubes through which the water is passed in series, means to supply feed water at one end of the series, a supplemental feed water supply pipe connected at an intermediate point in the series, a cylindrical valve arranged to control the flow through said pipe, a closed expansible pressure chamber containing fluid at each end of said valve and contacting therewith, the fluid in one of said chambers being subjected to a pressure corresponding to the temperature of the steam generated in said boiler, and the other to a pressure corresponding to the temperature of the boiler water, said valve and said chambers being constructed and arranged to close said pipe when the pressures in the two chambers are equal and to open said pipe when the steam generated is hotter than the boiler water.

28. A heating surface, means to cool said surface, a pair of thermostatic controls, each connected to said means and arranged to maintain said means inoperative while each of said thermostats is subjected to the same temperature and to operate said means when one of said thermostats is subjected to a temperature higher than that to which the other thermostat is subjected.

29. A heating surface, means to cool said surface, a pair of thermostatic controls, each connected to said means and arranged to maintain said means inoperative while each of said thermostats is subjected to the same temperature and to operate said means when one of said thermostats is subjected to a temperature higher than that to which the other thermostat is subjected to supply a cooling medium in proportion to the difference of temperatures.

30. In a water tube steam boiler, means to feed water thereto, a temperature-controlled device to control the cooling of the tubes of said boiler without re-setting said device for changes of temperature in said boiler, said device being operated by change of generated steam from saturated to superheated.

31. In a series boiler, a single feed pump, means to control the quality of steam between excess water and superheated steam, said means comprising a valve and connections that admit water in excess of the usual feed water when the steam becomes superheated and a valve and connections that diminish the supply of feed water when the excess water reaches a predetermined maximum.

32. In an apparatus of the kind described, a furnace in which intense radiant heat is developed, a bank of tubes in position to be swept by the hot gases direct from the furnace, and an opposing wall of heat absorbing surface as distinguished from heat radiating material, whereby the exposed row of tubes in said bank will be protected from the direct radiation of heat from said opposing wall.

33. In an apparatus of the kind herein described, the combination with a furnace in which intense radiant heat is developed, of a heat absorbing surface screened from the fire and divided into two opposing parts between which the heat of the furnace is directed, whereby no part of said heat absorbing surface will be exposed to direct heat rays from the fire or the furnace walls.

34. In a furnace, a combustion chamber in which intense radiant heat is developed, a heat absorption chamber in open communication therewith, fluid conveying means located in said heat absorption chamber, said heat absorption chamber having wall portions in radiant heat receiving relation relative to said combustion chamber and in heat radiating relation to said fluid conveying means, and means upon said wall to prevent such heat radiation.

35. In an apparatus of the kind described, a bank of tubes adapted to be swept by hot gases from a source developing intense radiant heat, an opposing wall therefor of heat-absorbing surface as distinguished from heat-radiating material, whereby the exposed row of tubes in said bank will be protected from direct radiation of heat from said opposing wall, means for conveying a medium to be heated first through the bank of tubes to impart an initial heating thereto, and thence through the last mentioned heat-absorbing surface to further heat the same.

36. In a device of the class described, in combination, a furnace having a fire chamber in which intense radiant heat is developed and a heat-absorption chamber, a heat-absorbing surface therein adapted to receive heat from the hot gases and heat up a medium conveyed therethrough, means for shielding portions of said surface from the direct heat of the fire chamber, and means for controlling and preventing an excessive heating of said surface by radiation from the chamber walls including a second heat-absorbing surface in opposition to and co-operating with the first mentioned heating surface to prevent either surface attaining an excessive temperature.

37. In an apparatus of the kind described, the combination with a furnace in which intense radiant heat is developed, of a heat-absorption chamber therein, of a heat-absorbing surface within said chamber, a second heat-absorbing surface disposed in opposition to the first surface, means for admitting the heated gases from the furnace directly between said surfaces, said surfaces co-operating with each other to absorb heat and to prevent high and destructive heat radiance in said chamber.

38. In an apparatus of the kind described, in combination, a heat-absorption chamber and a fire chamber in which intense radiant heat is developed, walls for said chambers, a heat-absorbing surface in the absorption chamber adapted to be swept by hot gases, a second heat-absorbing surface on the wall opposite the first heat absorbing surface and adapted, by the absorption of heat thereby to prevent destructive radiation upon the first mentioned heating surface from said opposite wall, and means for directing gases from the fire chamber between the two heat-absorbing surfaces and for shielding other portions of the first heat-absorbing surface from the direct heat of the fire.

39. In an apparatus of the kind described, in combination, a source of heat adapted to develop intense radiant heat, means including a plurality of opposed heat-absorbing surfaces with provisions for conveying successively therethrough a medium to be heated, said surfaces and heat absorbing medium co-operating by absorbing heat to prevent heat inter-change by radiation between said surfaces, and a protecting wall arranged to shield one of said surfaces from the direct heat of said source and to direct the hot gases from the source between the said surfaces.

40. In an apparatus of the kind described, a furnace in which intense radiant heat is developed, in combination with a plurality of banks of heating surfaces through which the medium to be heated flows, a wall screening one bank of heating surfaces from the direct radiant heat of the furnace chamber, but permitting hot gases to sweep said last mentioned bank, the other bank of heating surfaces being disposed in opposition to the screened surface to absorb heat and prevent radiation of heat to those surfaces of such screened surface which are exposed to the hottest furnace gases, whereby the gas temperatures may be increased and the heating surfaces of the screened surface subsequently traversed by the hot gases may absorb proportionally more heat.

CHARLES J. HANIMAN.